United States Patent
Mitsch et al.

[11] Patent Number: 5,899,435
[45] Date of Patent: May 4, 1999

[54] MOLDED RUBBER VALVE SEAL FOR USE IN PREDETERMINED TYPE VALVES, SUCH AS, A CHECK VALVE IN A REGENERATIVE DESICCANT AIR DRYER

[75] Inventors: Matthew D. Mitsch; Lawrence R. Streitman, both of Pittsburgh, Pa.

[73] Assignee: Westinghouse Air Brake Co., Wilmerding, Pa.

[21] Appl. No.: 08/710,209

[22] Filed: Sep. 13, 1996

[51] Int. Cl.$^6$ .................................................. F16K 31/122
[52] U.S. Cl. .............................. 251/62; 34/80; 55/417; 251/63.5; 251/282; 251/356
[58] Field of Search ................... 34/80, 82, 300; 251/62, 63, 63.5, 82, 83, 282, 324, 325, 357, 364, 356; 55/417; 137/532, 533.21, 535, 540

[56] References Cited

U.S. PATENT DOCUMENTS

| | | | |
|---|---|---|---|
| 467,181 | 1/1892 | Michael | 251/82 |
| 685,748 | 11/1901 | Davis | 251/82 |
| 962,736 | 6/1910 | Bice | 251/63.4 |
| 977,105 | 11/1910 | Lippold | 137/533.21 |
| 1,245,516 | 11/1917 | Scheelk | 251/357 |
| 1,846,624 | 2/1932 | Volk et al. | 251/357 |
| 2,090,512 | 8/1937 | Ernst | 251/357 |
| 2,223,699 | 12/1940 | Norgren | 137/533.21 |
| 2,397,269 | 3/1946 | Kelly | 251/357 |
| 2,593,740 | 4/1952 | Faust | 251/357 |
| 2,602,467 | 7/1952 | Griswold | 137/533.21 |
| 2,634,754 | 4/1953 | Rahn | 251/63 |
| 2,654,560 | 10/1953 | Smith | 251/357 |
| 2,707,484 | 5/1955 | Rush | 251/63.4 |
| 2,778,598 | 1/1957 | Bolling, Jr. | 251/63 |
| 2,914,083 | 11/1959 | Cronkhite | 251/282 |
| 3,168,283 | 2/1965 | Gamble | 251/357 |
| 3,454,032 | 7/1969 | Hinz et al. | 251/82 |
| 3,592,563 | 7/1971 | Glass et al. | 137/596.2 |
| 3,884,251 | 5/1975 | Knight | 251/63.4 |
| 4,019,713 | 4/1977 | Deinlein-Kalb | 251/63.4 |
| 4,098,171 | 7/1978 | Haytayan | 251/357 |
| 4,307,654 | 12/1981 | De Almeida | 251/63.4 |
| 4,462,426 | 7/1984 | Rexer | 251/63.4 |
| 4,541,607 | 9/1985 | Hotger | 251/63.4 |
| 4,757,974 | 7/1988 | Ward et al. | 251/356 |
| 4,813,575 | 3/1989 | O'Connor | 251/82 |
| 4,945,941 | 8/1990 | Kocher | 251/364 |
| 5,411,375 | 5/1995 | Bauer | 251/83 |
| 5,423,129 | 6/1995 | Castle | 34/80 |
| 5,540,558 | 7/1996 | Harden et al. | 251/82 |

FOREIGN PATENT DOCUMENTS

| | | | |
|---|---|---|---|
| 207006 | 3/1957 | Australia | 137/356 |
| 462961 | 4/1975 | U.S.S.R. | 251/282 |
| 885142 | 12/1961 | United Kingdom | 251/357 |

*Primary Examiner*—George L. Walton
*Attorney, Agent, or Firm*—James Ray & Associates

[57] ABSTRACT

A valve seal system for passageway through a valve body emerging through a first generally flat and rigid surface, having a valve member including a resilient seal with generally flat exposed surface adapted to be brought into contact with the generally flat rigid surface, and having a generally circular, raised resilient ring portion extending from the generally flat exposed surface, the raised resilient ring portion adapted to be compressed against the generally flat rigid surface to seal the resilient seals against the generally flat rigid surface when said valve member is moved to a closed position by virtue of the raised resilient ring portion being compressed against the generally flat rigid surface.

15 Claims, 2 Drawing Sheets

MOLDED RUBBER VALVE SEAL FOR USE IN PREDETERMINED TYPE VALVES, SUCH AS, A CHECK VALVE IN A REGENERATIVE DESICCANT AIR DRYER

CROSS-REFERENCE TO RELATED APPLICATIONS

This patent application is closely related to patent applications bearing Ser. No. 08/713,782, titled "Regenerative Desiccant Air Dryer", now U.S. Pat. No. 5,715,621, and Ser. No. 08/713,471, titled "Desiccant Canister With Positioning Bore", now U.S. Pat. No. 5,689,893, both being filed currently herewith. Each of these copending patent applications is assigned to the assignee of the present invention and the teachings therein are incorporated into the present application by reference thereto.

FIELD OF THE INVENTION

The present invention generally relates to an air drying apparatus for inclusion within a compressed air system. More particularly, the present invention pertains to a new and improved resilient valve seal system, check valve closure element and check valve apparatus ideal for use within a regenerative desiccant air dryer sub-assembly for a compressed air system in which the resilient seal is a flat molded disk seal having a protruding or raised ring portion extending from a flat surface which is adapted to abut against a solid, flat surface to more positively close the valve. As compared to comparable prior art seals, this design significantly reduces machining cost and time and permits ready replaceability of worn seals.

BACKGROUND OF THE INVENTION

Air drying systems are well known and practiced in a variety of technical fields. One such prior art air drying system is a single tower system disclosed in U.S. Pat. No. 5,423,129. Disclosed therein is a single tower air drying system designed to provide clean and dry compressed air to a pneumatic system such as a brake system of a railroad train. That prior art system accomplishes this by removing moisture and airborne particulates from a stream of compressed air as it passes through a desiccant material contained within a single tower. FIG. 1 of that patent illustrates a cross-sectional view of the patented system. From right to left FIG. 1 of that patent shows an opening through which unpurified compressed air is received; a sump volume; the single tower housing the desiccant material; a purge check valve with a choke; a side chamber connected to a purge volume; a discharge air filter element; a discharge check valve; and an output chamber through which purified compressed air passes eventually to the pneumatic system.

In operation, the patented air drying system receives a supply of compressed air from an air compressor which typically contains an unacceptably high amount of moisture and other particulates suspended within the compressed air. This unpurified compressed air passes into the sump volume and then flows upwardly eventually reaching the desiccant material. The desiccant plays the key role within the single tower air drying system in that it absorbs the moisture and traps various particulates (e.g., dust, dirt, etc.) as the compressed air moves radially into and through the desiccant material. Once moisture and particulates are extracted from the air stream, the cleaned and dried compressed air continues flowing from the center of the desiccant material through the purge check valve situated near the top of the single tower. This purified compressed air then passes through the side chamber eventually reaching the purge volume.

The purge volume of the subject patented air drying system is capable of holding approximately five-hundred cubic inches (500 in$^3$) of purified compressed air. When the air compressor is cycled off, the single tower system operates in a purge mode. During the purge mode, the purified pressurized air contained within the purge volume passes slowly in the reverse direction through the choke in the purge check valve and then back through the desiccant material. This slow stream of dried air reabsorbs a portion of the moisture previously collected within the desiccant material. Having evaporated in this passing stream of dry air, the evaporated moisture eventually exhausts through the sump volume to atmosphere. This gradual purging of dry air back through the system serves to dry-out and thus rejuvenate the desiccant material. When the air compressor is again cycled on, the single tower system operates in a drying mode. During the drying mode, the desiccant material then again removes moisture from the stream of unpurified compressed air passing therethrough.

More recently, a double tower system has been proposed and developed in which a pair of desiccant containing towers are provided, each alternating back and forth between operation in drying mode and in recycle mode. This unique system avoids the need to have the source of unpurified air cycled-off in order to purge the desiccant material of the moisture it has accumulated, and thereby eliminate temporarily depriving the pneumatic system of a steady supply of clean and dried compressed air while the compressor is turned off, and in addition, is not otherwise limited in water removing capacity.

Whether utilizing a single tower or a double tower, the check valves utilized to regulate the streams of air through the desiccant containing tower or towers are rather complex as valves go, and are manufactured to rather exacting dimensions to assure positive control of the air streams which normally are under significant compression pressure. Typically, abutting valve surfaces are machined to provide a carefully machined ring-like metallic protuberance or raised ring portion, which to close the valve, is compressed into a flat rubber, or otherwise resilient, seal surface. Accordingly, careful and costly machining is required to achieve the solid metallic, raised ring surface or protuberance which, in operation, will be abut against and compress into the flat resilient seal member.

SUMMARY OF THE INVENTION

The present invention is predicated upon the conception and development of a valve sealing system whereby a resilient ring is made to seal against a flat metallic or otherwise solid, rigid valve body surface which thereby not only eliminates and simplifies machining requirements, but further provides a more positive and longer lasting sealing mechanism. Prior art valve seals of the same nature have always provided a hard and rigid body which includes a raised portion, such as a raised ring portion, which is adapted to be compressed into a smooth, flat resilient surface of a resilient seal member in order to effect a positive seal.

Pursuant to this invention, the materials are reversed, whereby the raised portion, such as a raised ring portion, is a part of the resilient body which is then compressed and deformed against a flat, hard and rigid surface. By virtue of reversing the two sealing body materials as described above, the raised ring portion can be formed by simply molding it as a part of the resilient body, as opposed to machining it into the hard metallic body. This not only eliminates the costly and time consuming machining effort, but has shown to provide a better seal in that a permanent compression set is avoided, as is typical with the prior art systems, and in addition is readily replaceable by merely replacing the resilient seal.

In its simplest form, the valve seal system of this invention comprises a system for sealing a passageway through a valve body such that the passageway emerges through a generally flat rigid surface. The valve member for closing the passageway is provided with a resilient sealing means having a generally flat exposed surface adapted to be brought into contact with the generally flat rigid surface through which the passageway emerges. The flat resilient sealing means is provided with a generally circular, raised resilient ring portion extending therefrom such that the resilient ring portion will be compressed against the flat rigid surface to positively seal the resilient sealing means thereagainst when the valve member is moved to a closed position.

In narrower aspects, this invention is addressed to a check valve closure element and a check valve apparatus for an air drying apparatus within a compressed air system which includes the above-described valve seal system as a part of the check valve mechanism. In essence, the check valve apparatus essentially includes a valve body defining an inlet channel and an outlet channel whereby the inlet channel and outlet channel are interconnected through a generally flat rigid valve body surface, which ideally is annular in shape and transverse to an axis of at least one of two channels i.e., inlet channel or outlet channel. A check valve closure element is included which is provided with resilient sealing means having a flat exposed surface. The flat exposed surface of the resilient sealing means is provided with a generally circular, raised resilient ring portion extending from the flat exposed surface, such that the raised resilient ring portion will be compressed against the flat rigid valve body surface to thereby positively seal the resilient sealing means against the flat rigid surface by virtue of the raised resilient ring portion being compressed against the flat rigid valve body surface. Obviously, means must be included for selectively advancing the resilient sealing means into the flat rigid valve body surface to compress the ring portion thereagainst to effect the seal.

OBJECTS OF THE INVENTION

It is, therefore, a primary object of the present invention to provide a new and improved valve sealing system requiring less machining to produce, in which a flat resilient seal is provided having a raised ring protuberance portion to effect a positive seal against a solid flat surface, whereby the resilient seal can be produced merely by molding.

Another object of this invention is to provide a new and improved check valve apparatus for a single or twin tower air drying apparatus, which check valve apparatus includes a closure element having a flat resilient seal with a raised ring protuberance portion to effect a positive seal against a solid flat surface, whereby the resilient seal can be produced merely by molding.

A further object of this invention is to provide a new and improved check valve closure element for use in the above-described check valve apparatus.

In addition to the objects and advantages of the present invention set forth above, various other objects and advantages will become more readily apparent to those persons skilled in the gas drying system art from the detailed description of the invention, particularly, when considered in conjunction with the attached drawings and with the appended claims.

DETAILED DESCRIPTION OF A PREFERRED EMBODIMENT OF THE INVENTION

Figure 1:
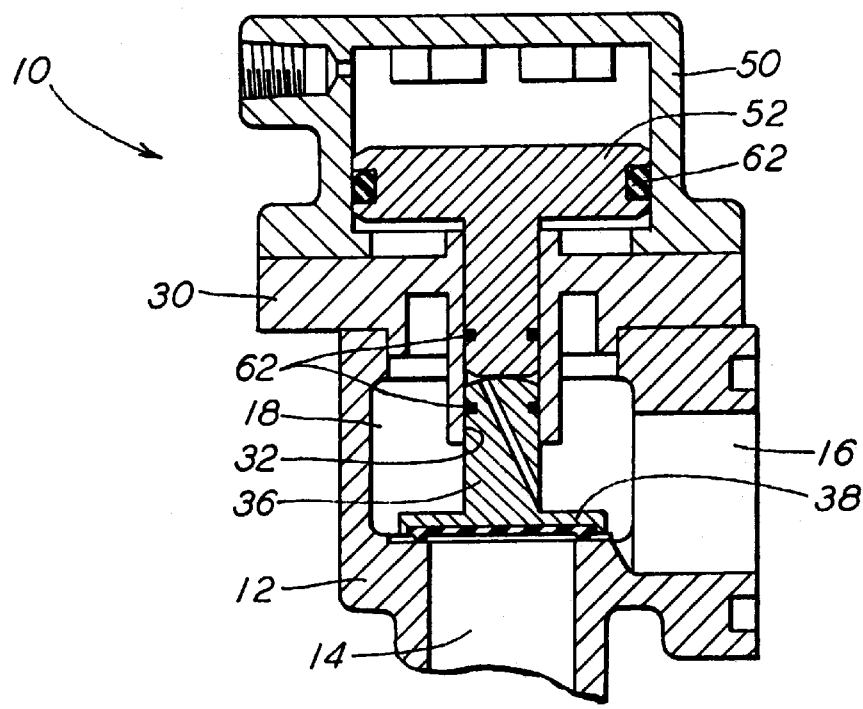
FIG. 1 is a cross-sectional view of a check valve in accordance with a preferred embodiment of this invention illustrating the check valve in the closed position.

Before describing the present invention in detail, for the sake of clarity and understanding, the reader is advised that identical components having identical functions in each of the accompanying drawings have been marked with the same reference numerals throughout each of the several Figures illustrated herein.

Figure 2:
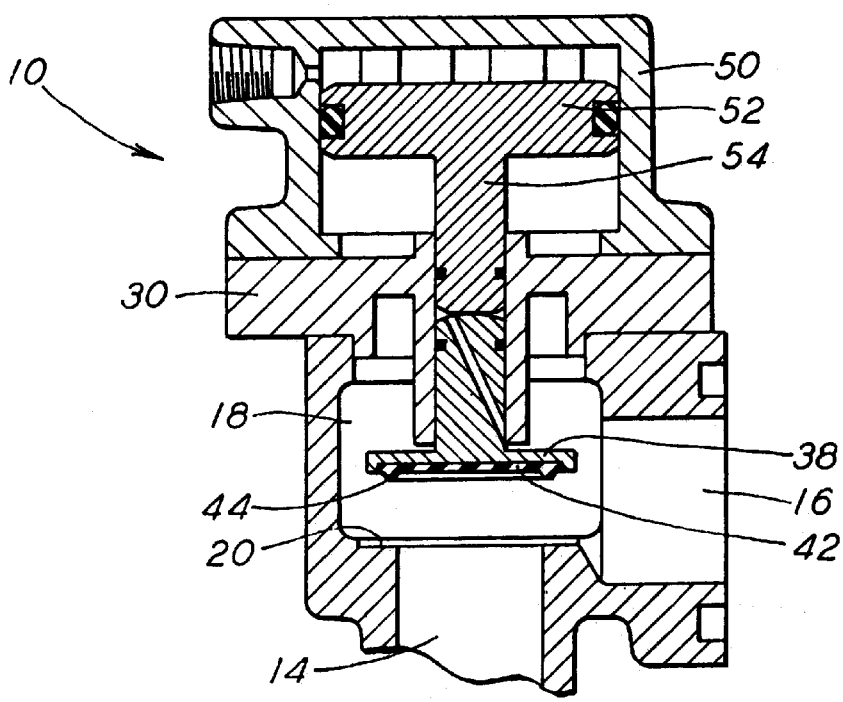
FIG. 2 is identical to FIG. 1 except that the check valve is shown in the open position.
Figure 3:
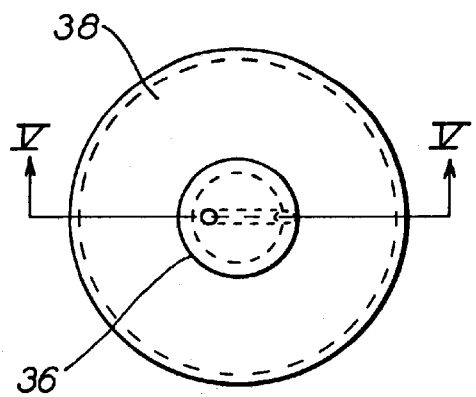
FIG. 3 is a top view of the check valve closure element utilized in the check valve illustrated in FIGS. 1 and 2.
Figure 4:
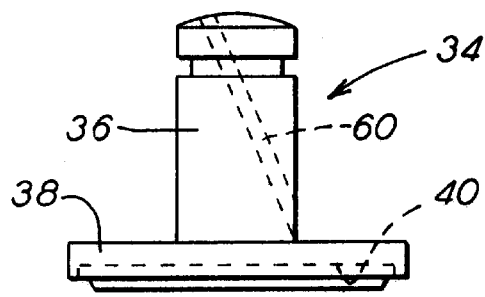
FIG. 4 is a side view of the check valve closure element illustrated in FIG. 3.
Figure 5:
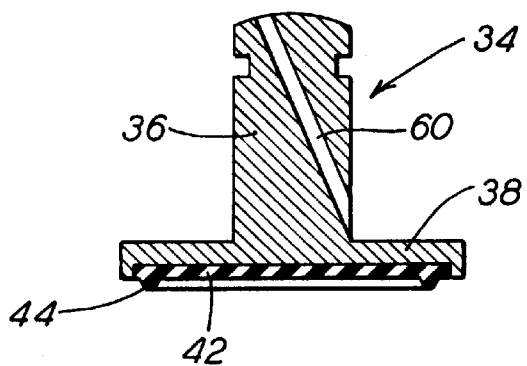
FIG. 5 is identical to FIG. 4 except that the side view of the check valve closure element is shown in cross-section.

Reference to FIGS. 1 and 2 will illustrate a presently preferred embodiment of a check valve in accordance with this invention wherein the inventive check valve 10 comprises a valve body 12 housing inlet passageway 14 and an outlet passageway 16, which passageways 14 and 16 intersect at valve chamber 18. As can be seen, inlet passageway 14 emerges into valve chamber 18 through a cylindrical opening in a flat, annular surface 20 machined into the base of valve chamber 18 encircling inlet passageway 14, while outlet passageway 16 is open to valve chamber 18 laterally at the side thereof. An inlet conduit means (not shown) is attachable to the bottom of valve body 12 for admitting compressed gas via inlet passageway 14 and an outlet conduit means (not shown) is attachable to the side of valve body 12 for exhausting compressed gas via outlet passageway 16. A valve control opening 22 is provided through the upper surface of valve body 12 directly opposed to inlet passageway 14.

A control cylinder housing 30 is bolted onto the outer top surface of valve body 12 such that control cylinder 32 thereon is axially disposed directly over passageway 14. A check valve closure element 34, having a cylindrical stem 36 axially extending from a wafer-shaped valve body 38, is slidably movable within control cylinder 32 of control cylinder housing 30. Specifically, cylindrical stem 36 is fitted within the lower end of control cylinder 32 with wafer-shaped valve body 38 transversely disposed therebelow suspended within valve chamber 18. The lower transverse face of wafer-shaped valve body 38 has a shallow cylindrical recess machined into the underface thereof for purposes of receiving a generally circular resilient sealing means 42 axially disposed against the underside of said wafer-shaped valve body 38 opposite from said cylindrical stem 36, said resilient sealing means 42, ideally being a hard rubber disk secured within the shallow cylindrical recess, which is adapted to abut flushly against the flat annular surface 20 encircling inlet passageway 14.

A piston cylinder chamber 50 is bolted onto the top of control cylinder housing 30, which slidably houses piston 52 for reciprocal motion within piston cylinder chamber 50. Piston 52 has two radii, a larger, upper radius defining the driving portion of piston 52 which permits the piston 52 to be reciprocally driven within piston cylinder chamber 50, and a stem piston 54 extending below piston 52 which is adapted to snugly fit within the upper portion of control cylinder 32. As can be seen, the upper portion of control cylinder 32 receives stem piston 54, while the lower portion of control cylinder 32 receives cylindrical stem 36 on check valve 34.

Accordingly, reciprocal activation of piston 52 within piston cylinder chamber 50, will cause a corresponding reciprocal activation of stem piston 54 within the upper portion of control cylinder 32. Because of the air pressure within valve chamber 18, check valve closure element 34 will be biased upwardly with cylindrical stem 36 biased against stem piston 54 within control cylinder 32 so that cylindrical stem 36 will follow the reciprocal motion of stem piston 54. Accordingly, check valve closure element 34 will be reciprocally raised and lowered within valve chamber 18, with resilient sealing means 42 selectively being compressed against flat annular surface 20 to open and close inlet passageway 14. As can be seen, an equalizing bore 60 is provided diagonally through cylindrical stem 36 so that the air pressure between cylindrical stem 36 and stem piston 54 is equalized with the air pressure within valve chamber 18 to assure that a pressure or vacuum is not allowed to build-up within control cylinder 32 which would interfere with the ability of cylindrical stem 36 to maintain abutment against stem piston 54 and accordingly follow its reciprocal movement. In addition, rubber O-ring seals 62 are preferably provided around piston 52 and each of cylindrical stem 36 and stem piston 54 to prevent loss of air pressure within the system.

The crux of this invention resides in the generally circular, raised resilient ring portion 44 of resilient sealing means 42 which extends from the flat exposed surface of sealing means 42, thereby being adapted to be compressed against flat rigid and annular surface 20 to more positively seal the resilient sealing means 42 against surface 20. As noted above, prior art seals of the same nature have always provided a hard and rigid raised ring portion adapted to be compressed into a flat resilient surface, which normally requires complex and costly machining of the solid member having the raised ring portion. Contrary thereto, in this invention the raised ring portion is made to be a part of the resilient sealing member which can be formed simply by molding when the sealing member is molded, which eliminates machining thereof on the solid portion of the seal.

While the presently preferred embodiment for carrying out the instant invention has been set forth in detail according to the Patent Act, those persons of ordinary skill in the technical art to which this invention pertains may recognize various alternative ways of practicing the invention without departing from the spirit and scope of the appended claims. For example, the raised ring portion of the resilient seal has been shown to be circular, which would be ideal to seal against a circular passageway. However, it should be apparent that the raised ring portion could be formed to take any particular shape, such as a square for example, provided the shape utilized can be uniformly compressed against a flat, hard surface. In a like manner, the cross-sectional configuration of the raised ring portion is not critical and can take any form, although a half-circular cross-section is perhaps ideal so that it can be compressed against a solid flat surface with a minimum amount of damage thereto. While dimensions have not been exemplified in the above description, the thickness of the protruding ring portion should be enough to assure that its compression will not cause pressurized air to leak therepast; e.g., at least about $1/8$ in thickness for the above application, within an air drying application. Those of ordinary skill will also recognize that the foregoing description is merely illustrative and is not intended to limit the invention in any way.

We claim:

1. An improvement to a gas drying system of the type having a valve body that defines an inlet channel, an outlet channel and a valve chamber through which such channels interconnect, said improvement comprising:

(a) a valve seat, formed in such valve chamber, having a generally flat rigid surface from which a preferred one of such channels emerges;

(b) a valve member having (i) a stem portion at one end and (ii) at the other end, a wafer-shaped portion having attached thereto a resilient sealing means that features a generally flat exposed surface from which a raised resilient ring portion extends, said stem portion defining through itself an equalizing bore extending from an end surface of said stem portion to a side surface of said stem portion adjacent to said wafer-shaped portion for equalizing pressure between such valve chamber and a control cylinder approximate said stem portion, said raised resilient ring portion being molded as part of said generally flat exposed surface of said valve member and adapted to be compressed against and form a seal with said generally flat rigid surface of said valve seat; and (c) a means, operable with said stem portion of said valve member in said control cylinder, for selectively controlling movement of said valve member within such valve chamber so that said raised resilient ring portion can be (i) compressed against said generally flat rigid surface of said valve seat so as to close off such preferred channel from such valve chamber and (ii) withdrawn from said generally flat rigid surface of said valve seat so as to open such valve chamber to such preferred channel.

2. The improved gas drying system, according to claim 1, in which said generally flat rigid surface is generally annular in shape and transverse to an axis of such preferred channel.

3. The improved gas drying system, according to claim 1, in which said raised resilient ring portion of said resilient sealing means is circular in form and has a uniform half-circular cross-section.

4. The improved gas drying system, according to claim 1, in which said resilient sealing means and said raised resilient ring portion is a unitary piece made of molded hard rubber.

5. The improved gas drying system, according to claim 4, in which said raised resilient ring portion has a thickness of at least about $1/8$ inch.

6. A check valve closure element for a check valve within an air drying element, said check valve closure element comprising a stem member axially extending from a wafer-shaped valve body, said stem member slidably disposed within a control cylinder of such check valve, said stem member defining through itself an equalizing bore extending from an end surface of said stem member to a side surface of said stem member adjacent to said wafer-shaped valve body for equalizing pressure between a valve chamber of said check valve and said control cylinder atop said end surface, a generally circular resilient sealing means axially bonded to said wafer-shaped valve body opposite from said stem member, said resilient sealing means having a generally flat exposed surface, said generally flat exposed surface having a generally circular raised resilient ring portion extending from and molded as part of said generally flat exposed surface, said raised resilient ring portion adapted to be compressed against a generally flat rigid surface to positively seal said resilient sealing means against such generally flat rigid surface by virtue of said raised resilient ring portion being compressed against such generally flat rigid surface when such check valve is in a closed position, and moved away from such generally flat rigid surface when such check valve is in an open position.

7. A check valve closure element for a check valve within an air drying element, according to claim 6, in which said raised resilient ring portion of said resilient sealing means is circular in form and has a uniform half-circular cross-section.

8. A check valve closure element for a check valve within an air drying element, according to claim 6, in which said resilient sealing means and said raised resilient ring portion is a unitary piece made of molded hard rubber.

9. A check valve closure element for a check valve within an air drying element, according to claim 6, in which said stem member is cylindrical in shape and has a groove therearound for receiving a rubber O-ring seal for sealing against such control cylinder of such check valve.

10. A check valve apparatus for a gas drying system comprising:
  (a) a check valve body defining an inlet channel and an outlet channel, said inlet channel and said outlet channel being interconnected through a generally flat rigid valve body surface;
  (b) a check valve element having a stem member and a generally circular resilient sealing means attached to a wafer-shaped base of said check valve element, said resilient sealing means having a generally flat exposed surface with a generally circular raised resilient ring portion extending from and molded as part of said generally flat exposed surface, said raised resilient ring portion adapted to be compressed against said generally flat rigid valve body surface to positively seal said resilient sealing means against said generally flat rigid surface, said stem member defining through itself an equalizing bore for equalizing pressure present at opposite ends of said stem member; and
  (c) means, acting upon said stem member, for selectively compressing said raised resilient ring portion against said generally flat rigid valve body surface to close said check valve apparatus, and to withdraw said check valve element and said resilient sealing means therewith away from said generally flat rigid valve body to open said check valve apparatus, said resilient sealing means being bonded to said wafer-shaped base of said check valve element.

11. A check valve apparatus for a gas drying system, according to claim 10, in which said generally flat rigid surface is generally annular in shape and transverse to an axis of at least one of said inlet channel and said outlet channel.

12. A check valve apparatus for a gas drying system, according to claim 10, in which said raised resilient ring portion of said resilient sealing means is circular in form and has a uniform half-circular cross-section.

13. A check valve apparatus for a gas drying system, according to claim 10, in which said resilient sealing means and said raised resilient ring portion is a unitary piece made of molded hard rubber.

14. A check valve apparatus for a gas drying system, according to claim 13, in which said raised resilient ring portion of said resilient sealing means has a thickness of at least about 1/8 inch.

15. A check valve apparatus for a gas drying system, according to claim 10, in which said means for selectively compressing said raised resilient ring portion against said generally flat rigid valve body surface to close said check valve apparatus, and to withdraw said check valve element and said resilient sealing means therewith away from said generally flat rigid valve body to open said check valve apparatus comprises a pneumatically operated piston.

* * * * *